(12) United States Patent
Kamran et al.

(10) Patent No.: US 11,210,141 B2
(45) Date of Patent: Dec. 28, 2021

(54) PRIORITY-BASED CPU MULTITASKING SYSTEM AND METHOD

(71) Applicant: EMC IP Holding Company, LLC, Hopkinton, MA (US)

(72) Inventors: Lior Kamran, Rishon LeZion (IL); Amitai Alkalay, Kadima (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 151 days.

(21) Appl. No.: 16/665,391

(22) Filed: Oct. 28, 2019

(65) Prior Publication Data

US 2021/0124619 A1    Apr. 29, 2021

(51) Int. Cl.
| G06F 9/46 | (2006.01) |
| G06F 9/50 | (2006.01) |
| G06F 9/38 | (2018.01) |
| G06F 9/52 | (2006.01) |
| G06F 9/48 | (2006.01) |

(52) U.S. Cl.
CPC .......... *G06F 9/5038* (2013.01); *G06F 9/3836* (2013.01); *G06F 9/4887* (2013.01); *G06F 9/52* (2013.01)

(58) Field of Classification Search
CPC .... G06F 9/5038; G06F 9/3836; G06F 9/4887; G06F 9/52
See application file for complete search history.

(56) References Cited

U.S. PATENT DOCUMENTS

2013/0007765 A1* 1/2013 Yamashita ............ G06F 9/4881
718/107

* cited by examiner

Primary Examiner — Gregory A Kessler
(74) Attorney, Agent, or Firm — Brian L Colandreo; Mark H. Whittenberger; Holland & Knight LLP (57) ABSTRACT

A method, computer program product, and computing system for executing a first sub-thread of an operating system thread on a central processing unit (CPU) of the computing device. The CPU may be released for a defined period of time. One of an application and a second sub-thread of the operating system thread may be executed based upon, at least in part, an execution priority of the operating system thread and an execution priority of the application.

20 Claims, 6 Drawing Sheets

PRIORITY-BASED CPU MULTITASKING SYSTEM AND METHOD

BACKGROUND

Storing and safeguarding electronic content may be beneficial in modern business and elsewhere. Accordingly, various methodologies may be employed to protect and distribute such electronic content.

In some implementations, an operating system thread may be configured to suspend itself and allow another application to utilize the CPU. One approach detects when an operating system thread is idle in order to suspend the CPU and detects when new events arrive for the operating system thread to schedule back.

However, for a storage system that has continuous background activity, the storage system may not be idle, as the storage system may utilize e.g., 100% CPU most of the time. Since conventional approaches release the CPU by suspending the operating system thread, there may be a significant penalty from unused CPU cycles when other applications do not need the CPU, because these other applications will release the CPU before consuming all the given time, and the operating system thread will get scheduled only when new events are detected. In addition, when no other application needs the CPU, there will be two unnecessary context-switches (e.g., one for suspend and one for resume). As will be discussed in greater detail below, embodiments of the present disclosure may utilize execution priorities to avoid these penalties and achieve an optimized solution for a storage system with background operations.

SUMMARY OF DISCLOSURE

In one example implementation, a computer-implemented method executed on a computing device may include, but is not limited to, executing a first sub-thread of an operating system thread on a central processing unit (CPU) of the computing device. The CPU may be released for a defined period of time. One of an application and a second sub-thread of the operating system thread may be executed based upon, at least in part, an execution priority of the operating system thread and an execution priority of the application.

One or more of the following example features may be included. Releasing the CPU may include lowering the execution priority of the operating system thread below the execution priority of the application. Executing one of the application and the second sub-thread of the operating system thread may include executing the application while the application has an execution priority greater than the execution priority of the operating system thread during the defined period of time. Executing one of the application and the second sub-thread of the operating system thread may include executing the second sub-thread of the operating system thread when the application does not need the CPU. Executing one of the application and the second sub-thread of the operating system thread may include executing the second sub-thread of the operating system thread when the application releases the CPU during the defined period of time. The execution priority of the operating system thread may be raised above the execution priority of the application after the defined period of time. The execution of the application may be disabled by increasing the execution priority of the operating system thread.

In another example implementation, a computer program product resides on a computer readable medium that has a plurality of instructions stored on it. When executed by a processor, the instructions cause the processor to perform operations that may include, but are not limited to, executing a first sub-thread of an operating system thread on a central processing unit (CPU) of the computing device. The CPU may be released for a defined period of time. One of an application and a second sub-thread of the operating system thread may be executed based upon, at least in part, an execution priority of the operating system thread and an execution priority of the application.

One or more of the following example features may be included. Releasing the CPU may include lowering the execution priority of the operating system thread below the execution priority of the application. Executing one of the application and the second sub-thread of the operating system thread may include executing the application while the application has an execution priority greater than the execution priority of the operating system thread during the defined period of time. Executing one of the application and the second sub-thread of the operating system thread may include executing the second sub-thread of the operating system thread when the application does not need the CPU. Executing one of the application and the second sub-thread of the operating system thread may include executing the second sub-thread of the operating system thread when the application releases the CPU during the defined period of time. The execution priority of the operating system thread may be raised above the execution priority of the application after the defined period of time. The execution of the application may be disabled by increasing the execution priority of the operating system thread.

In another example implementation, a computing system includes at least one processor and at least one memory architecture coupled with the at least one processor, wherein the processor is configured to execute a first sub-thread of an operating system thread on a central processing unit (CPU) of the computing device. The processor may be further configured to release the CPU for a defined period of time. The processor may be further configured to execute one of an application and a second sub-thread of the operating system thread based upon, at least in part, an execution priority of the operating system thread and an execution priority of the application.

One or more of the following example features may be included. Releasing the CPU may include lowering the execution priority of the operating system thread below the execution priority of the application. Executing one of the application and the second sub-thread of the operating system thread may include executing the application while the application has an execution priority greater than the execution priority of the operating system thread during the defined period of time. Executing one of the application and the second sub-thread of the operating system thread may include executing the second sub-thread of the operating system thread when the application does not need the CPU. Executing one of the application and the second sub-thread of the operating system thread may include executing the second sub-thread of the operating system thread when the application releases the CPU during the defined period of time. The execution priority of the operating system thread may be raised above the execution priority of the application after the defined period of time. The execution of the application may be disabled by increasing the execution priority of the operating system thread.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
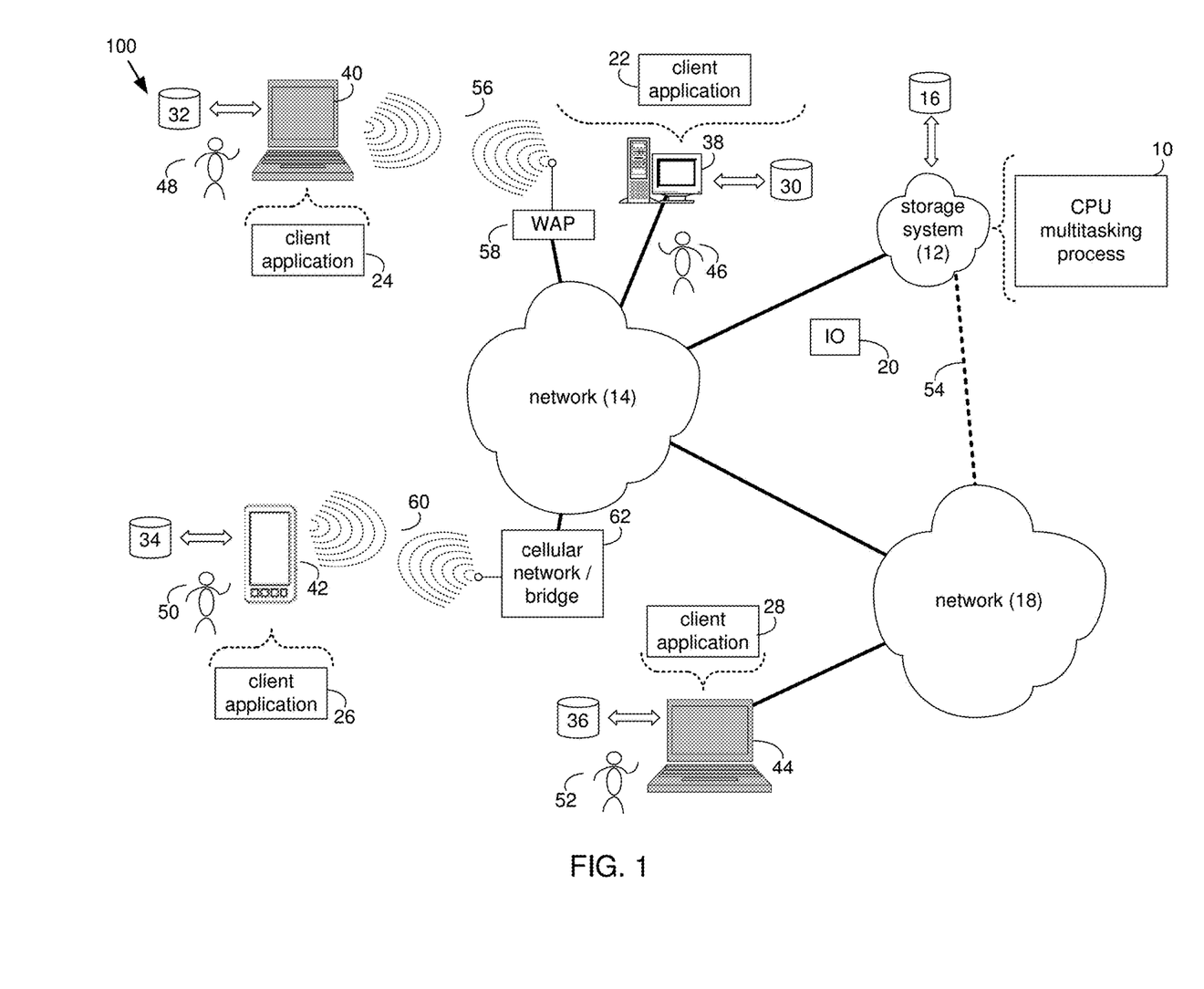
FIG. 1 is an example diagrammatic view of a storage system and a CPU multitasking process coupled to a distributed computing network according to one or more example implementations of the disclosure.

System Overview:

Referring to FIG. 1, there is shown CPU multitasking process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of CPU multitasking process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of CPU multitasking process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a CPU multitasking process, such as CPU multitasking process 10 of FIG. 1, may include but is not limited to, executing a first sub-thread of an operating system thread on a central processing unit (CPU) of the computing device. The CPU may be released for a defined period of time. One of an application and a second sub-thread of the operating system thread may be executed based upon, at least in part, an execution priority of the operating system thread and an execution priority of the application.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
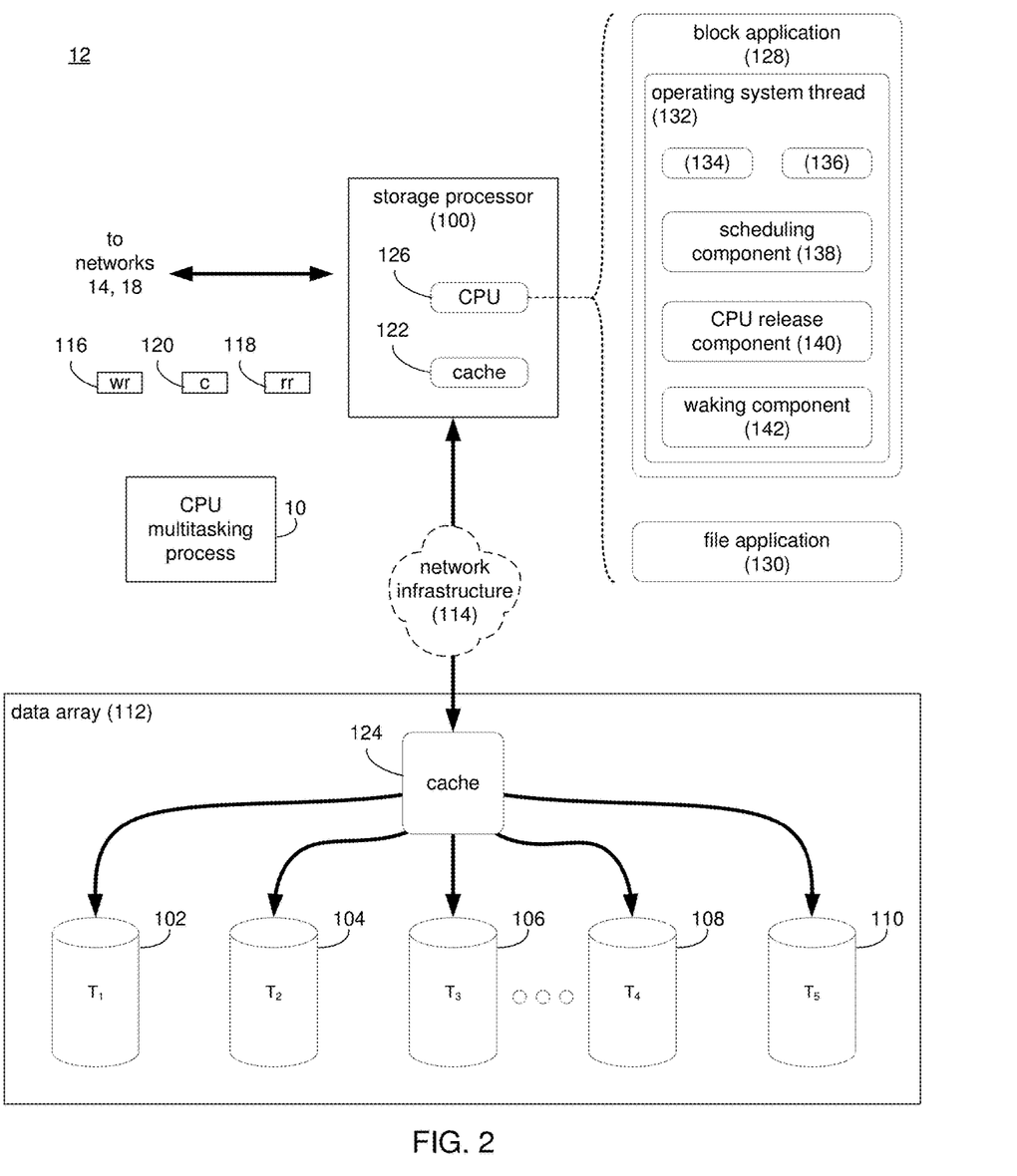
FIG. 2 is an example diagrammatic view of the storage system of FIG. 1 according to one or more example implementations of the disclosure.
Figure 3:
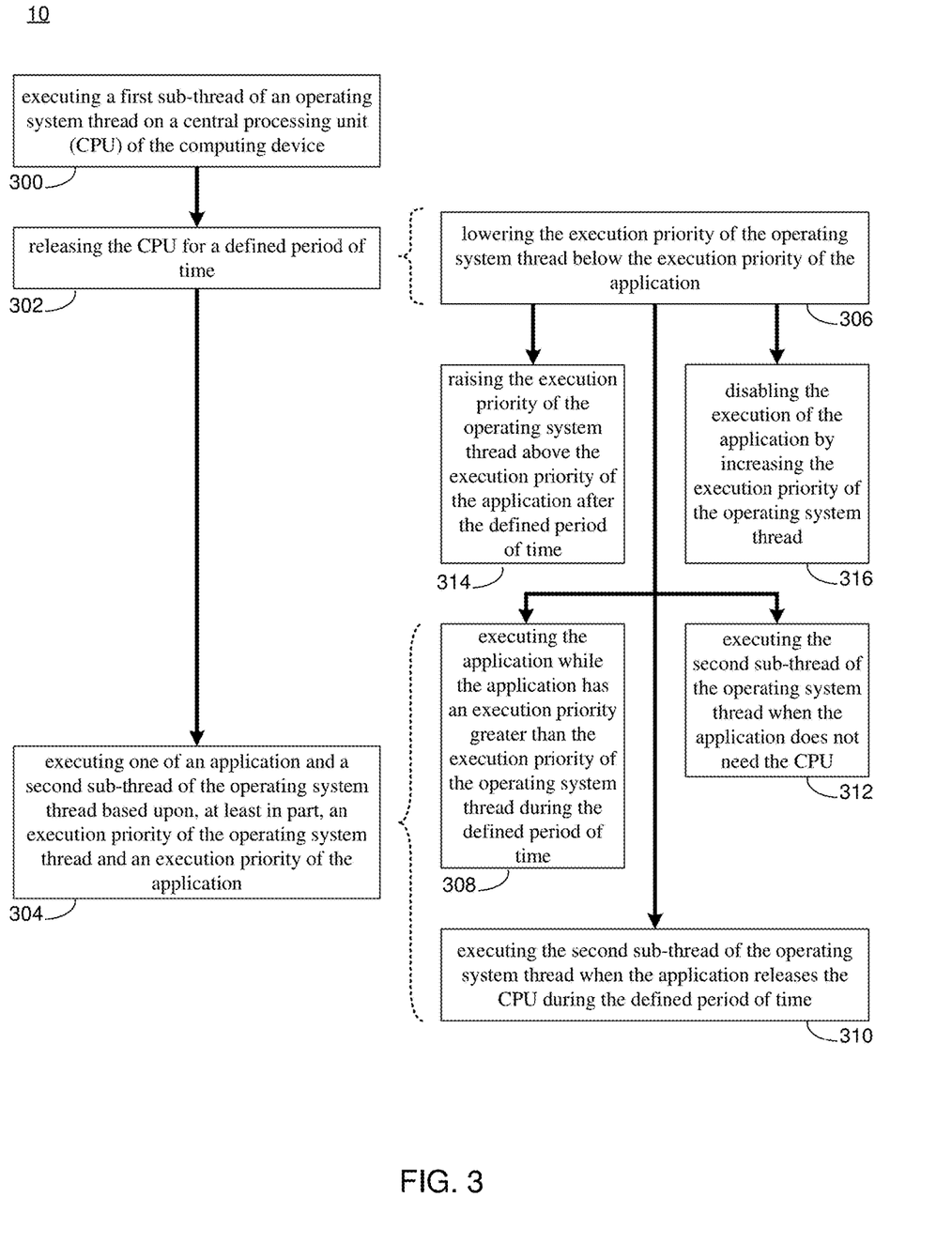
FIG. 3 is an example flowchart of CPU multitasking process according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of CPU multitasking process 10. The instruction sets and subroutines of CPU multitasking process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of CPU multitasking process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of CPU multitasking process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of CPU multitasking process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage processor 100 may include one or more central processing units (CPUs) (e.g., CPU 126). In some implementations, the one or more CPUs may include a multicore CPU. As is known in the art, a multicore CPU may be configured to execute multiple threads or processes concurrently on each core. However, it will be appreciated that CPU 126 may not be a multicore CPU within the scope of the present disclosure. In some implementations, CPU 126 may execute one or more applications (e.g., block application 128 and file application 130). A block application (e.g., block application 128) may generally execute a single operating system thread per CPU core of a multicore CPU (e.g., CPU 126), which may implement block functionality on data array 112.

In some implementations, block application 128 may run on top of a Preemptive Operating System (OS). As is known in the art, a Preemptive OS generally allows the operating system to preempt (i.e. stop) a running operating system thread without the operating system thread's cooperation, and execute something else, for example another operating system thread. An operating system thread may generally include multiple sub-threads as lightweight implementations of the operating system thread. For example, block application 128 may include an operating system thread (e.g., operating system thread 132) with a plurality of sub-threads (e.g., sub-threads 134, 136). While an example of e.g., one operating system thread with e.g., two sub-threads has been described above, it will be appreciated that any number of operating system threads and sub-threads for each operating system thread may be used within the scope of the present disclosure. In some implementations, a file application (e.g., file application 130) may generally organize data as a single piece of information inside a folder within data array 112. When data from a particular folder or file needs to be accessed, storage processor 100 may require a path to locate the data within data array 112.

In some implementations, each operating system thread (e.g., operating system thread 132) may implement a scheduling component (e.g., scheduling component 138) configured to schedule the execution of the plurality of sub-threads (e.g., sub-threads 134, 136). In some implementations, each operating system thread (e.g., operating system thread 132) may be configured to poll its interfaces for new events (e.g., polling for completions of submitted IO requests to data array 112) and poll for new IO requests from the user (e.g., client devices 38, 40, 42, 44). Accordingly, each operating system thread may fully utilize the CPU or CPU core it is running on, because even when there is no actual work, the operating system thread may continuously check its interfaces. In some implementations, this always-polling design may be optimized for a storage system that requires low latency and high IOPS (I/O per second) as there are no context switches and no interrupts involved.

In some implementations, storage system 12 may process background operations which may run during the processing of IO requests from a user, but also when no IO requests are present. In some implementations, background operations may include compression, de-duplication, meta-data defragmentation, calculation of RAID protection from media failures, etc. Furthermore, storage system 12 may defer some background processing to be executed when there is less IO load from the user, to serve IO requests more quickly, thus reducing the latency and improving the storage system performance. In some implementations, background operations may be a fundamental part of storage system 12. For example, suppose storage system 12 includes a log-structured file system (LFS) that performs defragmentation and garbage collection on metadata. Accordingly, the ability to multitask background IO requests may contribute to the efficient operation of storage system 12.

As discussed above, suppose storage system 12 is required to run another application, for example a file application (e.g., file application 130). Storage system use patterns may dynamically change over time (i.e. the user of the system can use only the block application for some time and then use only the file application, and it can also use both of them simultaneously, each with a different load that can also change. Therefore, storage system 12 may be required to dynamically adapt to the user operation pattern of the e.g., two applications to support dynamic load balancing. As will be discussed in greater detail below, CPU multitasking process 10 may allow storage system 12 to multitask CPU operations for sub-threads (e.g., sub-threads 134, 136) of an operating system thread (e.g., operating system thread 132) of a block application (e.g., block application 128) and other non-block applications (e.g., file application 130).

The CPU Multitasking Process:

Referring also to FIGS. 3-12 and in some implementations, CPU multitasking process 10 may execute 300 via the computing device, a first sub-thread of an operating system thread on a central processing unit (CPU) of the computing device. The CPU may be released 302 for a defined period of time. One of an application and a second sub-thread of the operating system thread may be executed 304 based upon, at least in part, an execution priority of the operating system thread and an execution priority of the application.

As will be discussed in greater detail below, implementations of the present disclosure may allow storage system 12 to multitask CPU operations for sub-threads (e.g., sub-threads 134, 136) of an operating system thread (e.g., operating system thread 132) of a block application (e.g., block application 128) and other non-block applications (e.g., file application 130) based upon, at least in part, execution priorities assigned to the operating system thread and other non-block applications. In some implementations, an operating system thread may be configured to suspend itself and allow another application to utilize the CPU. One approach detects when an operating system thread is idle in order to suspend the CPU and detects when new events arrive for the operating system thread to schedule back.

However, for a storage system that has continuous background activity, the system may not be idle, as the storage system may utilize e.g., 100% CPU most of the time. Since conventional approaches release the CPU by suspending the operating system thread, there may be a significant penalty from unused CPU cycles when other applications do not need the CPU, because these other applications will release the CPU before consuming all the given time, and the operating system thread will get scheduled only when new events are detected. In addition, when no other application wants the CPU, there will be two unnecessary context-switches (e.g., one for suspend and one for resume). As will be discussed in greater detail below, embodiments of the present disclosure may utilize scheduling priorities to avoid these penalties and achieve an optimized solution for a storage system with background operations.

In some implementations, CPU multitasking process 10 may execute 300 via the computing device, a first sub-thread of an operating system thread on a central processing unit (CPU) of the computing device. As discussed above and in some implementations, a block application (e.g., block application 128) may include one or more operating system threads (e.g., operating system thread 132) executed on a CPU (e.g., CPU 126). In some implementations, block application 128 may generally execute a single operating system thread per CPU core of a multicore CPU (e.g., CPU 126), which may implement block functionality on data array 112.

In some implementations and as discussed above, an operating system thread may generally include multiple sub-threads as lightweight implementations of an operating system thread. For example, block application 128 may include an operating system thread (e.g., operating system thread 132) with a plurality of sub-threads (e.g., sub-threads 134, 136).

Figure 4:
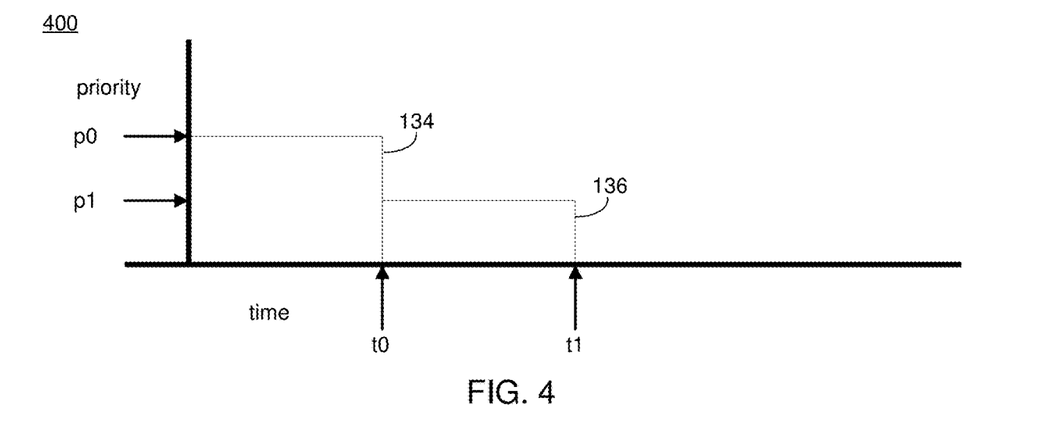
FIGS. 4-12 are example diagrammatic views of the execution of operating system threads and/or applications according to one or more example implementations of the disclosure.
Figure 5:
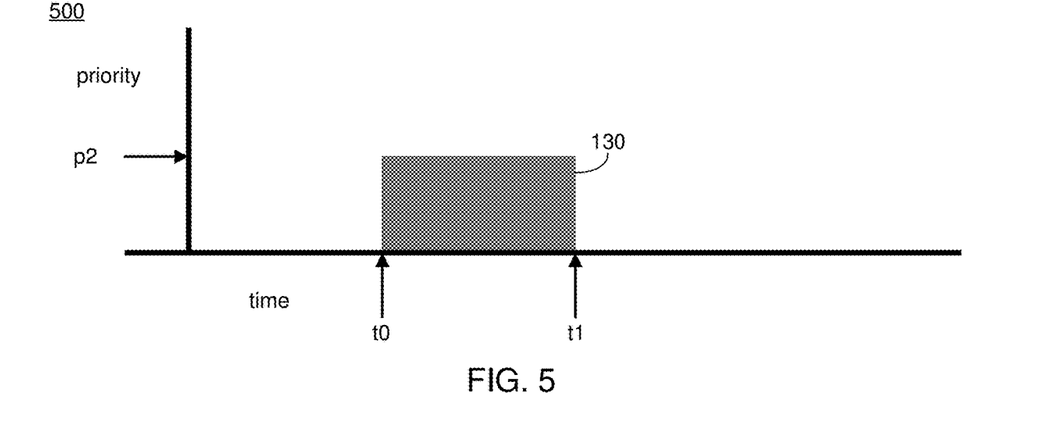

Referring also to the example of FIG. 4, suppose CPU multitasking process 10 executes 300 a first sub-thread (e.g., sub-thread 134) of an operating system thread (e.g., operating system thread 132) on a CPU (e.g., CPU 126). In this example and as will be discussed in greater detail below, CPU multitasking process 10 may execute 300 the first sub-thread (e.g., sub-thread 134) of an operating system thread (e.g., operating system thread 132) on the CPU with a first execution priority (e.g., execution priority "p0" as shown in FIG. 4).

In some implementations, CPU multitasking process 10 may release 302 the CPU for a defined period of time. Referring again to the example of FIG. 2 and in some implementations, CPU multitasking process 10 may utilize the scheduling component (e.g., scheduling component 138) of each operating system thread (e.g., operating system thread 132) by determining whether or not to release 302 the CPU from executing sub-threads of the operating system thread each time the operating system thread (e.g., operating system thread 132) switches between sub-threads. In some implementations and because sub-threads generally run for a very short time, this allows CPU multitasking process 10 to have a very high resolution for making decisions on when and how to release the CPU for other applications. As shown in FIG. 2 and in some implementations, operating system thread 132 may include a CPU release component (e.g., CPU release component 140) and a waking component (e.g., waking component 142).

In some implementations, the CPU release component (e.g., CPU release component 140) may determine whether the operating system thread (e.g., operating system thread 132) will give up execution to let the other applications run (e.g., file application 130). In some implementations, CPU release component 140 may make this determination on every sub-thread switch (i.e., switch between sub-threads of operating system thread). In some implementations, CPU release component 140 may release the CPU at a predefined CPU release interval for a predefined CPU release duration. In some implementations, CPU release component 140 may release the CPU according to various algorithms. For example, CPU release component 140 may include various algorithms that may determine when to release the CPU and for how long. In some implementations, when the operating system thread decides (e.g., via CPU release component 140) to release the CPU, CPU release component 140 may post the duration for which it allows the other application to utilize the CPU (e.g., a define period of time), as well as the time it decided to release the CPU. In some implementations, these values (e.g., CPU release duration and CPU release time) may be made be visible to other operating system threads. In some implementations, the defined period of time for releasing the CPU may be user-defined, pre-defined, and/or automatically defined by CPU multitasking process 10.

In some implementations, the waking component (e.g., waking component 142) may check if there are currently other suspended operating system threads that should be awakened. In some implementations, the waking component may perform this check each sub-thread switch and/or before making the decision whether to give up the CPU, by checking the values (e.g., CPU release duration and CPU release time) posted by the CPU release component of another operating system thread before releasing 302 the CPU.

In some implementations, conventional approaches for releasing a CPU include an operating system thread suspending itself (e.g. calling to 'pthread_cond_wait' in Linux®). However, if no other application are ready to run, conventional approaches get a penalty of two context-switches (i.e. one of suspending the operating system thread, and the second of scheduling back the operating system thread to run). Also, when the other application releases the CPU before consuming the granted time, conventional approached waste CPU cycles until the suspended operating system thread is awakened. Accordingly, CPU multitasking process 10 may utilize a priority system (e.g. priorities of the Real-Time scheduler in Linux®) of the scheduling component (e.g., scheduling component 138) in order to avoid this overhead.

In some implementations, releasing 302 the CPU may include lowering 306 the execution priority of the operating system thread below the execution priority of the application for the defined period of time. In some implementations, when the operating system thread (e.g., operating system thread 132) releases 302 the CPU (e.g., CPU 126), CPU multitasking process 10 may lower 306 the execution priority of the operating system thread to be lower than the other application for the defined period of time. In some implementations and referring again to the example of FIG.

Figure 6:
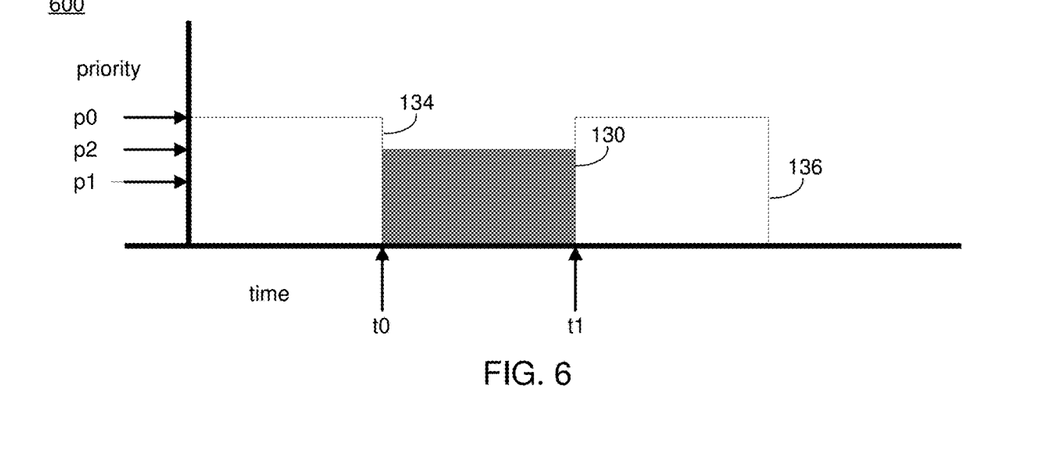
Figure 7:
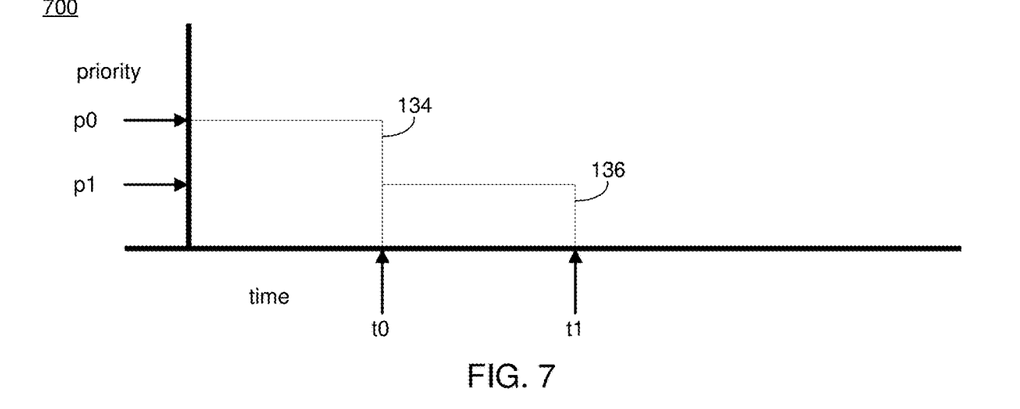
Figure 8:
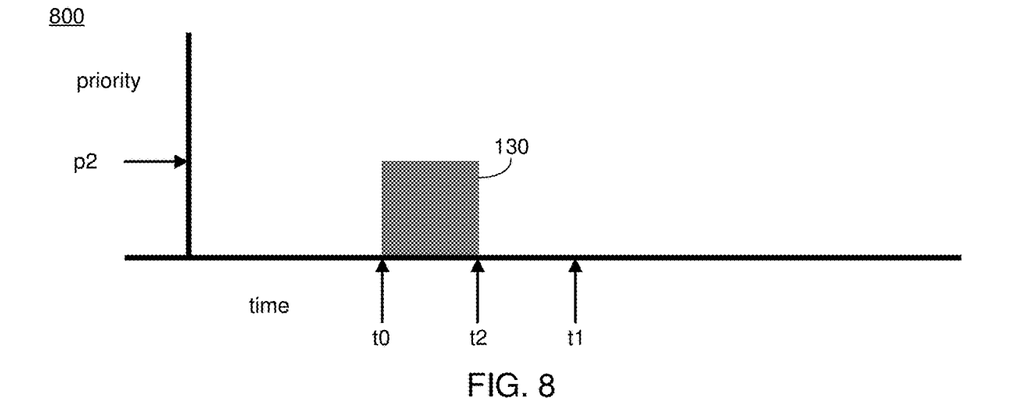

4, CPU multitasking process 10 may execute 300 first sub-thread 134 with a first execution priority (e.g., execution priority "p0"). In some implementations, the first execution priority (e.g., execution priority "p0") may be the highest possible priority that is lower than the execution priority of kernel jobs and, as will be discussed in greater detail below, higher than the execution priority of a non-block application (e.g., file application 130). In some implementations and as discussed above, CPU multitasking process 10 may release 302 the CPU (e.g., after first sub-thread 134 has finished or has reached a breakpoint) by lowering 306 the execution priority of operating system thread (e.g., from execution priority "p0" to execution priority "p1"). In this example, CPU multitasking process 10 may lower 306 the execution priority of operating system thread 132 from "p0" to "p1" for the defined period of time starting from time "t0" to "t1" (e.g., the defined period of time).

In some implementations, CPU multitasking process 10 may execute 304 one of an application and a second sub-thread of the operating system thread based upon, at least in part, an execution priority of the operating system thread and an execution priority of the application. Referring also to the example of FIG. 5 and in some implementations, CPU multitasking process 10 may define an execution priority for a non-block application (e.g., file application 130) to be lower than that of the operating system thread when the operating system thread is executing a sub-thread (e.g., first sub-thread 134) on the CPU (e.g., execution priority "p2"). In one example, suppose file application is ready to be executed on the CPU at time "t0". Referring also to the example of FIG. 6, CPU multitasking process 10 may execute 300 the first sub-thread (e.g., first sub-thread 134) of operating system thread 132 on the CPU until CPU multitasking process 10 releases the CPU at time "t0" until time "t1". As discussed above and in some implementations, CPU multitasking process 10 may release 302 the CPU from executing sub-threads of the operating system thread by lowering 306 the execution priority of operating system thread 132 from priority "p0" to priority "p1". In this example, at time "t0", CPU multitasking process 10 may execute 304 file application 130 based upon, at least in part, an execution priority of the operating system thread and an execution priority of the application. For example, because file application has a higher execution priority (e.g., execution priority "p2") than the operating system thread (e.g., execution priority "p1"), CPU multitasking process 10 may execute 304 file application 130 on the CPU until time "t1".

In some implementations, executing 304 one of the application and the second sub-thread of the operating system thread may include executing 308 the application while the application has an execution priority greater than the execution priority of the operating system thread during the defined period of time. Referring again to the example of FIG. 6, CPU multitasking process 10 may execute 308 file application 130 while file application 130 has an execution priority greater than the execution priority of operating system thread 132 during the defined period of time (e.g., time between "t0" and "t1").

In some implementations, executing 304 one of the application and the second sub-thread of the operating system thread may include executing the second sub-thread of the operating system thread when the application does not need the CPU. Referring also to the example of FIG. 7 and in some implementations, suppose no file application is ready to be executed on the CPU at time "t0". In this example, operating system thread 132 may resume its execution (e.g., executing second sub-thread 136) because sub-thread 136 has the highest execution priority. In this example, two context-switches penalties may be avoided as operating system thread does not need to suspend a sub-thread of operating system thread 132 nor switch back to a previous sub-thread.

Referring again to the example of FIG. 6, suppose no other applications need the CPU. In this case, no context switch will happen. After waking up at time "t1", CPU multitasking process 10 may execute second sub-thread 136 of operating system thread 132 thus resuming its normal flow of execution (i.e. poll its interfaces, fetch new events and process all the work that derives from them). In some implementations, when operating system thread 132 wakes up, it may resume to the exact running model as before.

Figure 9:
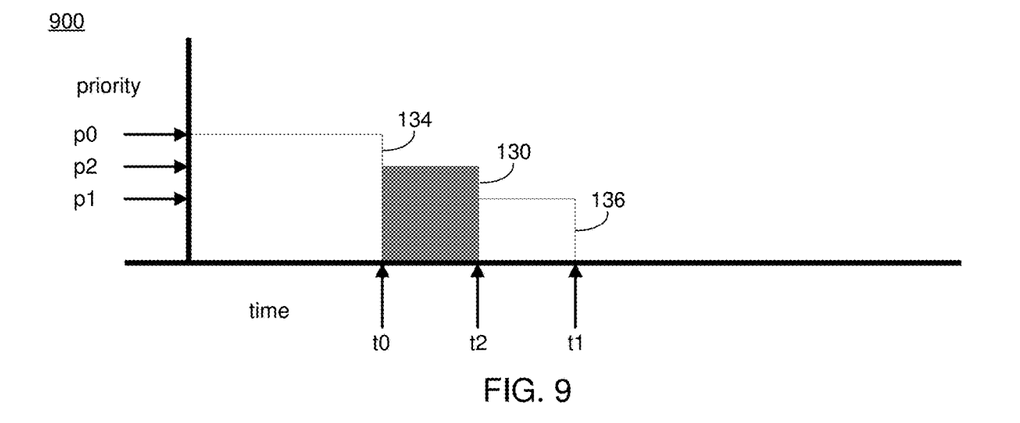

In some implementations, executing 304 one of the application and the second sub-thread of the operating system thread may include executing 310 the second sub-thread of the operating system thread when the application releases the CPU during the defined period of time. Referring also to the examples of FIGS. 8-9 and in some implementations, suppose file application 130 requires a smaller execution duration (e.g., time between "t0" and "t2") than the defined period of time during which the CPU is released to file application 130. Conventional approaches would result in file application 130 finishing executing at time "t2" and wasting CPU cycles until time "t1" when operating system 132 would wake and begin executing second sub-thread 136. However, as shown in the example of FIG. 9, even if file application finishes executing at time "t2", operating system thread 132 may be scheduled back by the operating system immediately without any involvement from other operating system threads because operating system thread 132 has the highest execution priority at time "t2".

In some implementations, CPU multitasking process 10 may raise 314 the execution priority of the operating system thread above the execution priority of the application after the defined period of time. Referring again to the example of FIG. 6 and in some implementations, CPU multitasking process 10 may raise 314 the execution priority of operating system thread 132 after the defined period of time (e.g., after time "t1") from a lower execution priority (e.g., execution priority "p1") to a higher execution priority (e.g., execution priority "p0" which is higher than execution priority "p2" used for file applications). In some implementations, CPU multitasking process 10 may raise 314 the execution priority of operating system thread 132 using another operating system thread. For example, CPU multitasking process 10 may cause another operating system thread to increase the priority of operating system thread 132. When its execution priority is increased from execution priority "p1" as shown in FIG. 4 to execution priority "p0" as shown in FIG. 6 at time "t1", operating system thread 132 may immediately get scheduled back and execute 304 second sub-thread 136 on the CPU.

Figure 10:
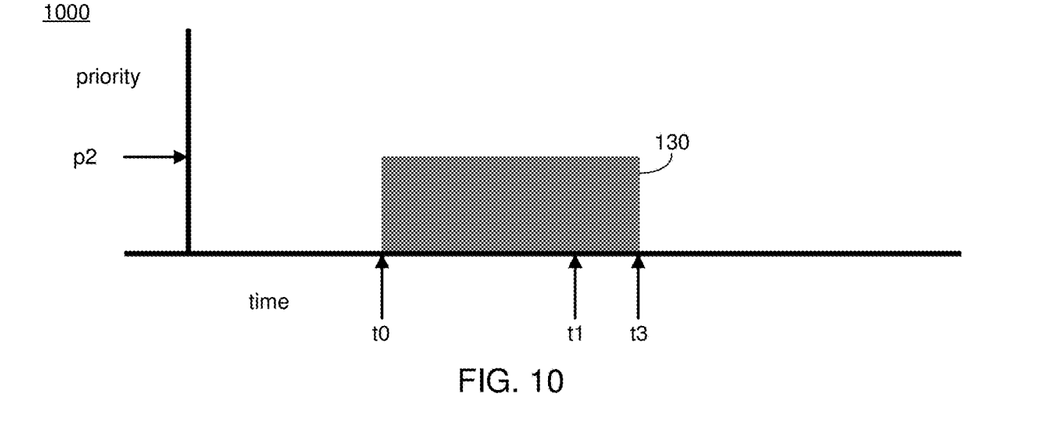
Figure 11:
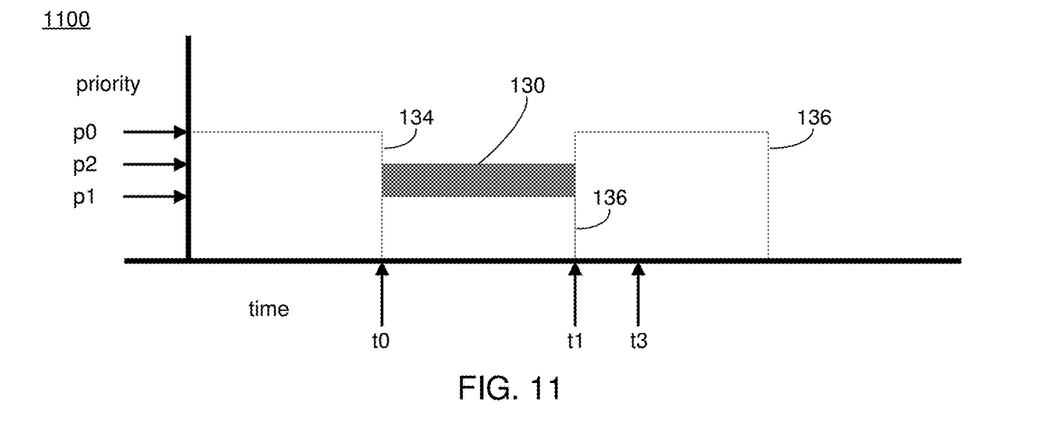

Referring also to the examples of FIGS. 10-11 and in some implementations, suppose file application 130 requires more time to execute (e.g., time between "t0" and "t3") than the defined amount of time the CPU is released to file application 130 (e.g., time between "t0" and "t1"). In this example, file application 130 may consume all of its granted time (e.g., time between "t0" and "t1"). In this case, CPU multitasking process 10 may cause another operating system thread to increase the priority of operating system thread 132. When its execution priority is increased (as shown in FIG. 11 at time "t1"), operating system thread 132 may immediately get scheduled back and execute 304 second sub-thread 136 on the CPU.

In some implementations, to avoid a deadlock situation where all operating system threads release their CPU core or release the CPU so there is no running operating system thread that can wake another operating system thread, CPU multitasking process 10 may ensure that at least one operating system thread is always running. For example and before releasing 302 the CPU, CPU multitasking process 10 may determine that at least one operating system thread is running and will not release the CPU if all the other operating system threads are currently suspended. In some implementations, when other operating system threads schedule back a suspended operating system thread, after checking its posted values, the other operating system thread may increase its scheduling priority back to the previous execution priority (e.g., execution priority "p0").

Figure 12:
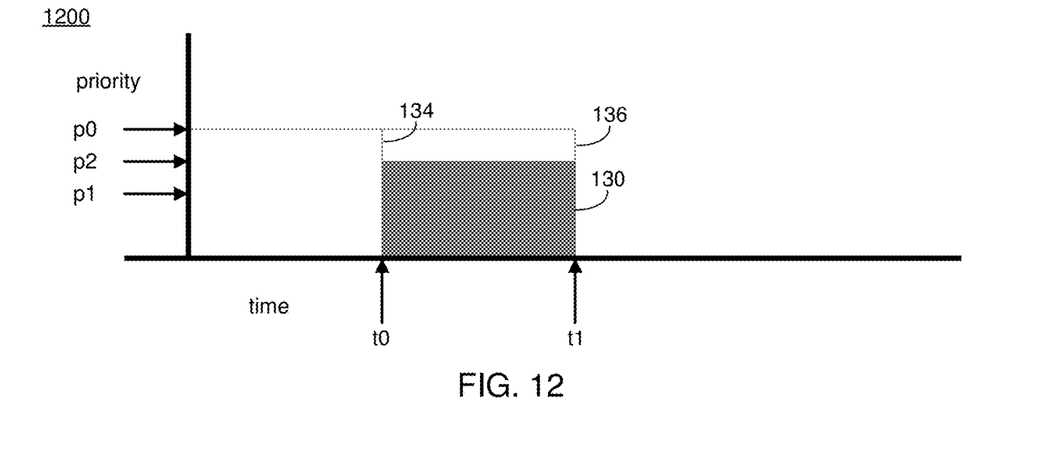

In some implementations, CPU multitasking process 10 may disable 316 the execution of the application by increasing the execution priority of the operating system thread. Referring also to the example of FIG. 12 and in some implementations, CPU multitasking process 10 may be easily and quickly enabled or disabled without disrupting the block application (e.g., block application 128) and while the storage system (e.g., storage system 12) is active. In some implementations, CPU multitasking process 10 may disable 316 the execution of the application by raising all operating system threads priorities and instructing them not to release the CPU. As shown in the example of FIG. 12, CPU multitasking process 10 may disable 316 the execution of file application 130 by increasing or raising the execution priority of operating system thread 132 (e.g., execution priority "p0") above the execution priority of file application 130 (e.g., execution priority "p2") and preventing CPU multitasking process 10 from releasing 302 the CPU while the functionality is disabled. In some implementations, disabling 316 the execution of the application may include setting a flag or other variable within storage processor 100 and/or CPU 126. In some implementations, the flexibility to disable 316 the releasing 302 of CPU 126 and execution 304 of the application based upon, at least in part, the priority of the operating system thread and the application may be significant, because when there is only a block application running, CPU multitasking process 10 completely eliminate the overhead associated with releasing 302 the CPU to other non-block applications. In some implementations, CPU multitasking process 10 may quickly resume CPU multitasking to release 302 the CPU to non-block applications when a non-block application (e.g., file application 130) is ready.

As discussed above and in some implementations of the present disclosure, CPU multitasking process 10 may guarantee that the operating system threads will not get preempted by the operating system and will continue to run until they voluntarily release the CPU, even if other applications are ready to run. It may also guarantee that when a suspended operating system thread becomes ready to run after another operating system thread increases its execution priority, the operating system will immediately preempt the other application and schedule the ready operating system thread.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    executing a first sub-thread of an operating system thread on a central processing unit (CPU) of the computing device;
    releasing the CPU for a defined period of time;
    executing one of an application and a second sub-thread of the operating system thread based upon, at least in part, an execution priority of the operating system thread and an execution priority of the application; and
    releasing the CPU via the operating system thread, wherein releasing the CPU is configured to guarantee that the operating system thread will not be preempted by an operating system associated with the operating system thread.

2. The computer-implemented method of claim 1, wherein releasing the CPU includes lowering the execution priority of the operating system thread below the execution priority of the application.

3. The computer-implemented method of claim 2, wherein executing one of the application and the second sub-thread of the operating system thread includes executing the application while the application has an execution priority greater than the execution priority of the operating system thread during the defined period of time.

4. The computer-implemented method of claim 2, wherein executing one of the application and the second sub-thread of the operating system thread includes executing the second sub-thread of the operating system thread when the application does not need the CPU.

5. The computer-implemented method of claim 2, wherein executing one of the application and the second sub-thread of the operating system thread includes executing the second sub-thread of the operating system thread when the application releases the CPU during the defined period of time.

6. The computer-implemented method of claim 2, further comprising:
    raising the execution priority of the operating system thread above the execution priority of the application after the defined period of time.

7. The computer-implemented method of claim 2, further comprising:
    disabling the execution of the application by increasing the execution priority of the operating system thread.

8. A computer program product residing on a non-transitory computer-readable medium having a plurality of instructions stored thereon which, when executed by a processor, cause the processor to perform operations comprising:
    executing a first sub-thread of an operating system thread on a central processing unit (CPU) of a computing device;
    releasing the CPU for a defined period of time;
    executing one of an application and a second sub-thread of the operating system thread based upon, at least in part, an execution priority of the operating system thread and an execution priority of the application; and
    releasing the CPU via the operating system thread, wherein releasing the CPU is configured to guarantee that the operating system thread will not be preempted by an operating system associated with the operating system thread.

9. The computer program product of claim 8, wherein releasing the CPU includes lowering the execution priority of the operating system thread below the execution priority of the application.

10. The computer program product of claim 9, wherein executing one of the application and the second sub-thread of the operating system thread includes executing the application while the application has an execution priority greater than the execution priority of the operating system thread during the defined period of time.

11. The computer program product of claim 9, wherein executing one of the application and the second sub-thread of the operating system thread includes executing the second sub-thread of the operating system thread when the application does not need the CPU.

12. The computer program product of claim 9, wherein executing one of the application and the second sub-thread of the operating system thread includes executing the second sub-thread of the operating system thread when the application releases the CPU during the defined period of time.

13. The computer program product of claim 9, wherein the operations further comprise:
raising the execution priority of the operating system thread above the execution priority of the application after the defined period of time.

14. The computer program product of claim 9, wherein the operations further comprise:
disabling the execution of the application by increasing the execution priority of the operating system thread.

15. A computing system comprising:
a memory; and
a processor configured to execute a first sub-thread of an operating system thread on a central processing unit (CPU) of a computing device, wherein the processor is further configured to release the CPU for a defined period of time, wherein the processor is further configured to execute one of an application and a second sub-thread of the operating system thread based upon, at least in part, an execution priority of the operating system thread and an execution priority of the application, and wherein the processor is further configured to release the CPU via the operating system thread, wherein releasing the CPU is configured to guarantee that the operating system thread will not be preempted by an operating system associated with the operating system thread.

16. The computing system of claim 15, wherein releasing the CPU includes lowering the execution priority of the operating system thread below the execution priority of the application.

17. The computing system of claim 16, wherein executing one of the application and the second sub-thread of the operating system thread includes executing the application while the application has an execution priority greater than the execution priority of the operating system thread during the defined period of time.

18. The computing system of claim 16, wherein executing one of the application and the second sub-thread of the operating system thread includes executing the second sub-thread of the operating system thread when the application does not need the CPU.

19. The computing system of claim 16, wherein executing one of the application and the second sub-thread of the operating system thread includes executing the second sub-thread of the operating system thread when the application releases the CPU during the defined period of time.

20. The computing system of claim 16, wherein the processor is further configured to:
raise the execution priority of the operating system thread above the execution priority of the application after the defined period of time.

* * * * *